June 5, 1923.
W. A. CAREY
1,457,767
MOLD FOR PLASTIC FLOWER BOXES OR THE LIKE
Filed Nov. 12, 1921　　　2 Sheets-Sheet 1
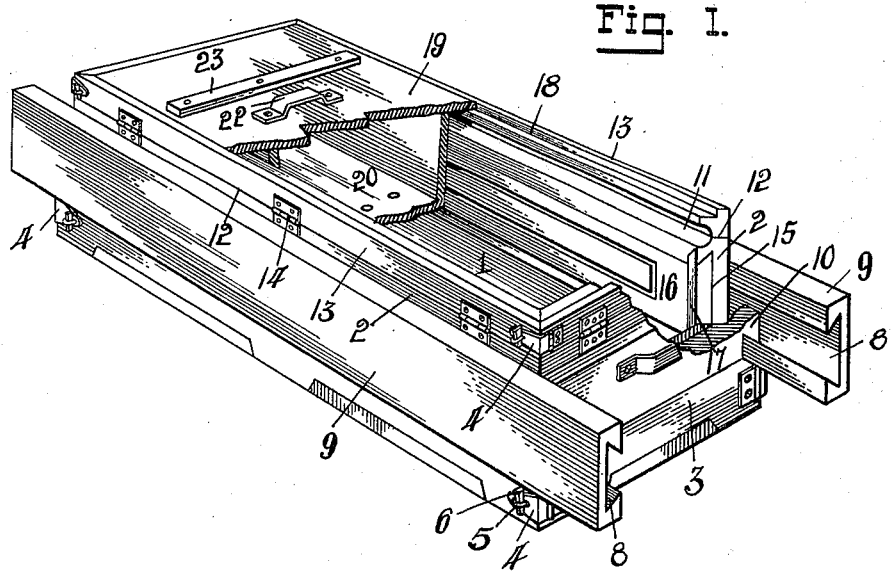
Fig. 1.
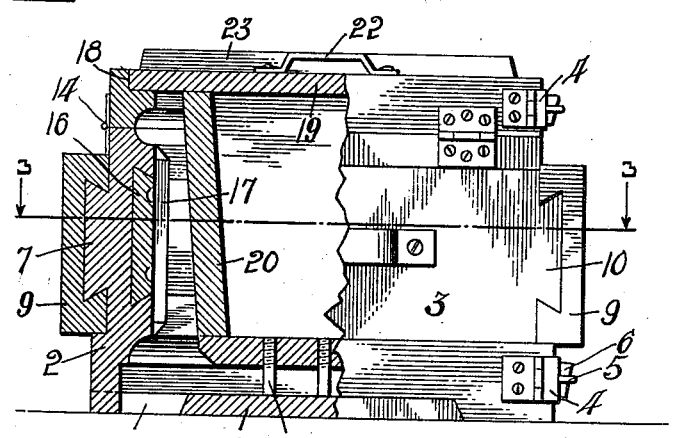
Fig. 2.
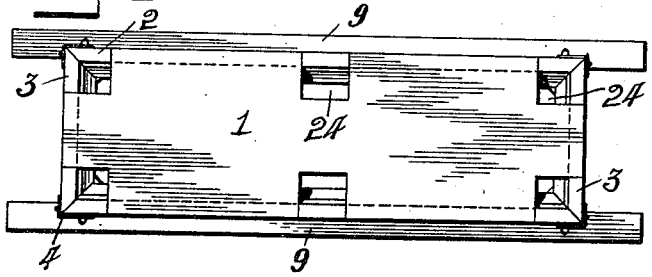
Fig. 2ª
INVENTOR.
William A. Carey.
BY *Owen Owen & Crampton*,
ATTORNEYS.

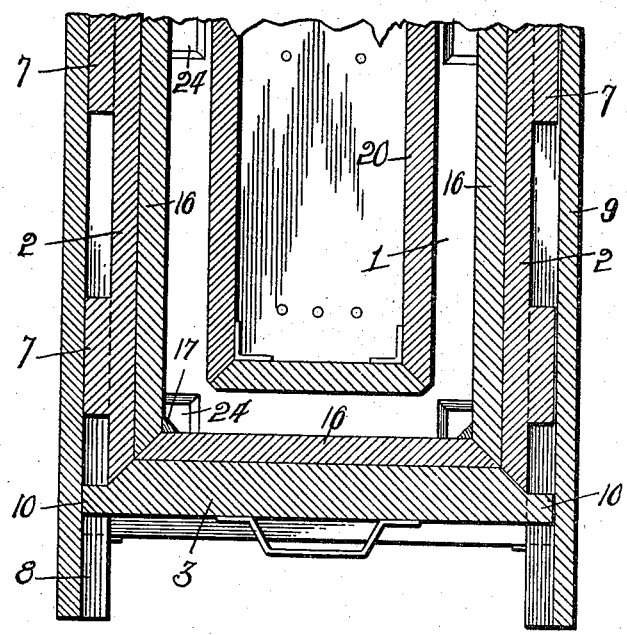
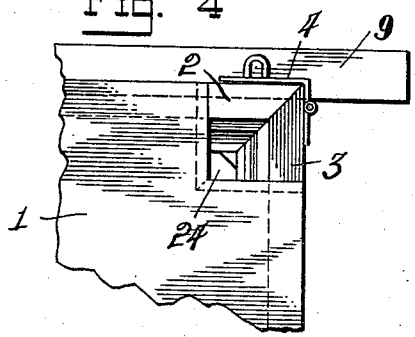
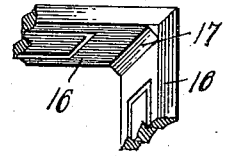

Patented June 5, 1923.

1,457,767

UNITED STATES PATENT OFFICE.

WILLIAM A. CAREY, OF TOLEDO, OHIO.

MOLD FOR PLASTIC FLOWER BOXES OR THE LIKE.

Application filed November 12, 1921. Serial No. 514,470.

*To all whom it may concern:*

Be it known that I, WILLIAM A. CAREY, a citizen of the United States, and a resident of Toledo, in the county of Lucas and State of Ohio, have made an Invention Appertaining to a Mold for Plastic Flower Boxes or the like; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to molds for plastic material and particularly to a mold for making flower boxes and the like.

The object of the invention is the provision of a simple and inexpensive knock-down mold of the character described, which is strong and rigid in its construction, changeable as to size and capable of being easily and quickly knocked down or built up, and which is provided with design strips capable of being changed to suit the side or end designs desired on the molded article.

The invention is fully described in the following specification, and while, in its broader aspect it is capable of embodiment in numerous forms, a preferred embodiment thereof is illustrated in the accompanying drawings, in which—

Fig. 1 is a perspective view of a mold embodying the invention with parts broken away. Fig. 2 is an end view thereof with a part broken away. Fig. 2ª is a reduced bottom view. Fig. 3 is a fragmentary section on the line 3—3 in Fig. 2. Fig. 4 is an enlarged bottom view of a corner portion of the mold, and Fig. 5 is a perspective fragmentary view of two design strips and a corner fillet member in assembled relation.

Referring to the drawings, 1 designates the bottom, 2, 2 the opposing sides and 3, 3 the opposing ends of the mold, the side and ends preferably having mitered corner joints. The sides and ends are releasably secured together at their corners adjacent to the upper and lower edges thereof by releasable fastening means 4 of any suitable form, which in the present instance comprises an angled strap member hinged to the respective ends and adapted to extend around the corners and provided near its free end with an eye for receiving a staple 5 on the side. The staple and strap members may be secured in engaged relation by a pin 6.

The sides 2 are provided on their outer sides with one or more dove-tail portions 7 which fit into dove-tail grooves 8 provided at the inner sides of side bars 9 longitudinally thereof and preferably throughout their entire length. The bars 9 are of greater length than the sides 2 and are intended to have the grooves 8 receive dove-tails 10 provided on the ends of the respective end members 3 so that the side bars are interlocked with the ends and cooperate therewith to prevent any outward movements of the sides 2. While it is preferable to provide the sides 2 with projections 7 for interengagement with the side bars 9, they may be entirely eliminated if desired inasmuch as the dove-tails 10 of the end members serve to retain the side bars in engagement with the sides. The side bars 9 are made longer than the sides 2 to enable the mold to be varied in length by substituting sides of different length for those in use, the ends of the mold remaining the same and being moved inward or outward along the side bars to suit the lengths of the sides employed. The projecting ends of the side bars also adapt the bars to serve as handles for lifting the mold.

In order to form the flower box or other article being molded near its top edge with a surrounding bead, the sides and ends of the mold are internally provided near their top edges with grooves 11 which meet at their ends to form a continuous recess around the inner surface of the mold adjacent to its upper edge. It is preferable to longitudinally split the end and side walls longitudinally of the grooves 11 in register with the bottoms thereof, as shown at 12, to form the sides and ends with the upper edge portions 13, which are connected to the body portions of the sides and ends by hinges 14 to adapt them to be turned outward to facilitate the removal of the molded article from the mold. The edge portions 13 are held in set-up position by a set of fastening means 4.

Each side 2 and end 3 of the mold is provided in its side lengthwise thereof with a recess 15, which is preferably of dove-tail form and in which a respective design strip 16 of dove-tail or other complemental shape is slidingly mounted, such strips being coextensive in length with the parts by which carried and having their adjacent ends mitered and in close fitting abutment. It is evident that to change the design formed on the sides and ends of a box being molded it is only necessary to remove one set of design strips and substitute another set therefor. 17 designate fillet strips which are set in the corners of the mold.

The top edges of the sides 2 and ends 3, or of the edge portions 13 thereof, if such edge portions are provided, are recessed, as at 18, to form seats for the edges of a cover 19, which fixedly carries a core member 20 of box form, in the present instance, at its inner side. This core is spaced at its sides, ends and bottom from the respective sides, ends and bottom of the mold box, so as to cooperate with the mold box to form a flower box or other box of desired shape. The bottom of the core has pins 21 projecting outward therefrom into contact at their outer ends with the bottom 1 of the mold box so as to form drainage openings in the bottom of the molded box. The cover 19 is provided with a set of handles 22 to facilitate a removal of the cover and its core member 20 from the mold box and the cover is also provided with cross-cleats 23 to adapt the mold box, when inverted for filling, to rest on such cleats. The mold box is intended to have the concrete or other plastic material introduced therein through pouring openings 24 provided in the bottom thereof, in the present instance at the corners and near the center. The bottom 1, which during the pouring of the concrete or other plastic material into the mold and during the drying operation is really the top of the mold, fits loosely into the bottom edge of the mold flush therewith due to portions of the mold sides and ends fitting into the filling openings 24.

In the use of a mold embodying my invention the sides 2, ends 3 and side bars 9 are assembled together, the interlocking of the end 3 with the side bars effecting a rigid holding of the side bars against the sides 2 of the mold to prevent expansion or outward movements thereof. The core box 20 and top 19 are then placed in the mold with the top seating in the recess 18 around the top edge of the mold box and the mold is then inverted so that the cleats 23 of the top 19 rest on a floor or other support. This having been done, the bottom 1 is placed in position on the mold bottom and the plastic material may then be poured into the mold through the openings 24. When the molded article has dried sufficiently to permit it to be removed from the mold, the mold is inverted to place its top uppermost and to permit the top 19 and core box 20 to be removed therefrom. The upper edge portions 13 of the sides and ends are then turned back to release the beads formed on the molded article by the recess 11, and the ends 3 are disconnected from the sides and slid outward therefrom and from engagement with the side bars 9, thus permitting the sides to be moved outward from engagement with the sides of the molded article.

It is evident that if it is desired to increase the length of the molded box, sides 2 of greater length than those before used may be employed without changing the ends, the side bars 9 being freely movable from engagement with one set of sides and engaged with the other set. It it also evident that the design strips 16 may be changed at will to suit the design desired.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent is,—

1. A mold of the class described having separable side and end members, a side bar disposed at the outer side of each side member longitudinally thereof, the end members and side bars having releasable dove tail connection which permit movements of the end members longitudinally of the side bars and cause the side bars and end members to cooperate to firmly hold the side members against outward movements.

2. A mold of the class described having side members and end members, the end members having dove-tail projections at their ends, side bars detachably carried by the side members longitudinally and at the outer sides thereof and having dove-tail grooves at their inner sides for slidingly receiving and interlocking with the respective dove-tail projections of the end members.

3. A mold of the class described having side members and end members, the end members having projections at their ends, means for detachably connecting the side and end members in assembled relation, and means extending lengthwise of the side members at the outer sides thereof and having grooves for longitudinal sliding interlocking engagement with the projections of the end members whereby the end members are movable toward and away from the side members while in engagement with the means, and cooperate with the means to prevent outward movement of the side members.

4. A mold of the class described having separable side and end members, detachable means for holding said members in assembled relation, a top mounted on the side and end members and having a core portion fixed to and projecting therefrom into the mold and a bottom removably mounted on the bottom edges of the side and end members and having openings through which a plastic material may be introduced into the mold when the mold is in inverted position.

In testimony whereof I have hereunto signed my name to this specification.

WILLIAM A. CAREY.